A. P. SANBORN & R. C. WILSON.
AUTOMATIC CAB SIGNALING AND TRAIN STOPPING MECHANISM.
APPLICATION FILED SEPT. 14, 1914.

1,186,844.

Patented June 13, 1916.
5 SHEETS—SHEET 4.

Inventors
A. P. Sanborn
and R. C. Wilson

A. P. SANBORN & R. C. WILSON.
AUTOMATIC CAB SIGNALING AND TRAIN STOPPING MECHANISM.
APPLICATION FILED SEPT. 14, 1914.

1,186,844.

Patented June 13, 1916.
5 SHEETS—SHEET 5.

Witnesses

Inventors
A. P. Sanborn
and R. C. Wilson

Attorneys

UNITED STATES PATENT OFFICE.

ARTHUR P. SANBORN AND ROY C. WILSON, OF OSSINING, NEW YORK.

AUTOMATIC CAB SIGNALING AND TRAIN-STOPPING MECHANISM.

1,186,844. Specification of Letters Patent. Patented June 13, 1916.

Application filed September 14, 1914. Serial No. 861,614.

*To all whom it may concern:*

Be it known that we, ARTHUR P. SANBORN and ROY C. WILSON, citizens of the United States, residing at Ossining, in the county of Westchester and State of New York, have invented certain new and useful Improvements in Automatic Cab Signaling and Train-Stopping Mechanism; and we do declare the following to be a full, clear, and exact description of the invention, such as will enable others skilled in the art to which it appertains to make and use the same.

This invention generically pertains to railroad block signaling systems but more especially to that class of the latter in which the signals are displayed within the locomotive cab.

One object of the invention is to provide a system which will greatly reduce the number of railroad calamities by preventing an engineer from unheedingly passing a signal indicative of danger as well as one which will at all times apprise him relative to the right of way.

A further object of our invention is to eliminat. the semaphore arms and bridges now employed by the usual block signaling system and in their stead, substitute a series of members disposed contiguous to the track and controlled by a mechanism located at the entrance to each block to coöperate with suitable circuit closing means carried by the train to indicate on the latter by means of suitable signals, caution, safety, or danger, as the case might be, depending on the condition of the block ahead.

Another and further object of the invention is the provision of means for energizing certain of the devices disposed contiguous to the track and deënergizing certain others pursuant to the condition of the track.

Another and still further object of the invention is to provide a series of signals situated within the locomotive cab and means for controlling these signals whereby when one signal is brought into operation, the other is made inoperative.

Another a id further object is to provide means for plainly and unmistakably indicating to the engineer the condition of the right of way as well as means for automatically bringing his train to a standstill should he fail to heed the danger signal and at the same time to automatically record the time at which the signal was given.

With these and other objects in view, our invention consists of certain details of construction and arrangement and combination of parts to be more particularly pointed out and claimed.

In the accompanying drawings in which similar reference numerals indicate corresponding parts: Fig. 3 is a diagrammatic view, illustrating the various signals; their circuits, and the means for controlling the same.

Briefly stated, our invention contemplates the us of two pairs of electromagnets disposed contiguous to the rails with one pair on each side of the latter and for the sake of convenience, one pair of these magnets will be designated as the service air magnet and emergency air magnet respectively and the other pair designated as the clear and caution magnets respectively. These magnets are energized when desired by a certain mechanism situated at the entrance to each block which mechanism is controlled by a towerman as would be the ordinary semaphore signal. Should the signal or towerman desire to indicate to the locomotive engineer that the track is clear, he, through the instrumentality of the mechanism situated at the entrance to each block, energizes the clear track magnet, which latter coöperates with certain means carried by the train to close a predetermined circuit thereon and display a yellow light within the engine cab. However, should the towerman desire that the engineer should proceed with caution, he through the aforementioned track mechanism, energizes the caution magnet which latter coöperates with means upon the train to close another circuit extinguishing the yellow light indicating safety and lighting a green lamp informing the engineer that he should proceed ahead with caution. On the other hand, should the block ahead be occupied and the signalman desires to inform the engineer of the existing danger condition of the block ahead, he through the mechanism located at the entrance to the block, energizes the two magnets hereinbefore referred to as the service air and emergency air magnets, which latter will coöperate with certain means carried by the train to stop the latter and at the same time extinguishing the green lamp and closing the circuit through a red lamp located within the engine cab and indicative of danger. Also in addition to displaying the danger signal within the locomotive cab, the two service and emergency air magnets will bring the train to a standstill and simultaneously record the time at which the danger signal was given.

Figure 1:
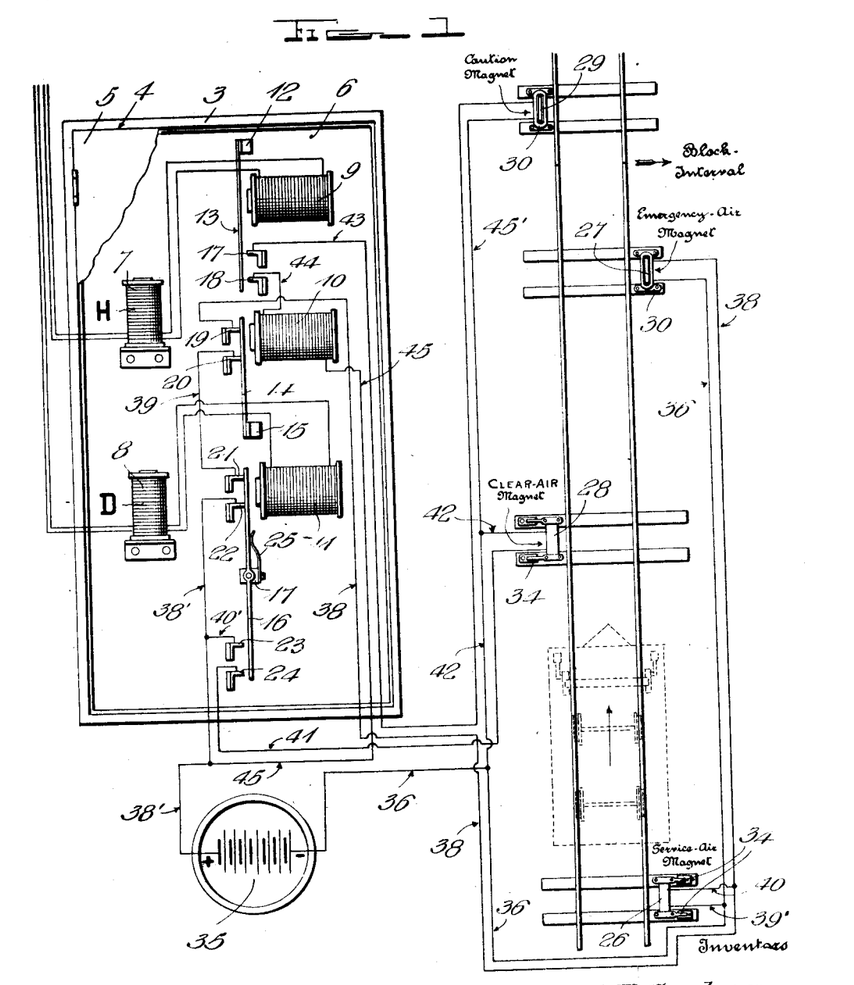
Figure 1 represents a diagrammatic view, illustrating the abutting extremities of two blocks, the relative arrangement of the track magnets, and the cabinet disposed at the entrance to each block and containing the means for controlling the track magnets, said cabinet having a part thereof broken away to show magnet controlling means.
Figure 2:
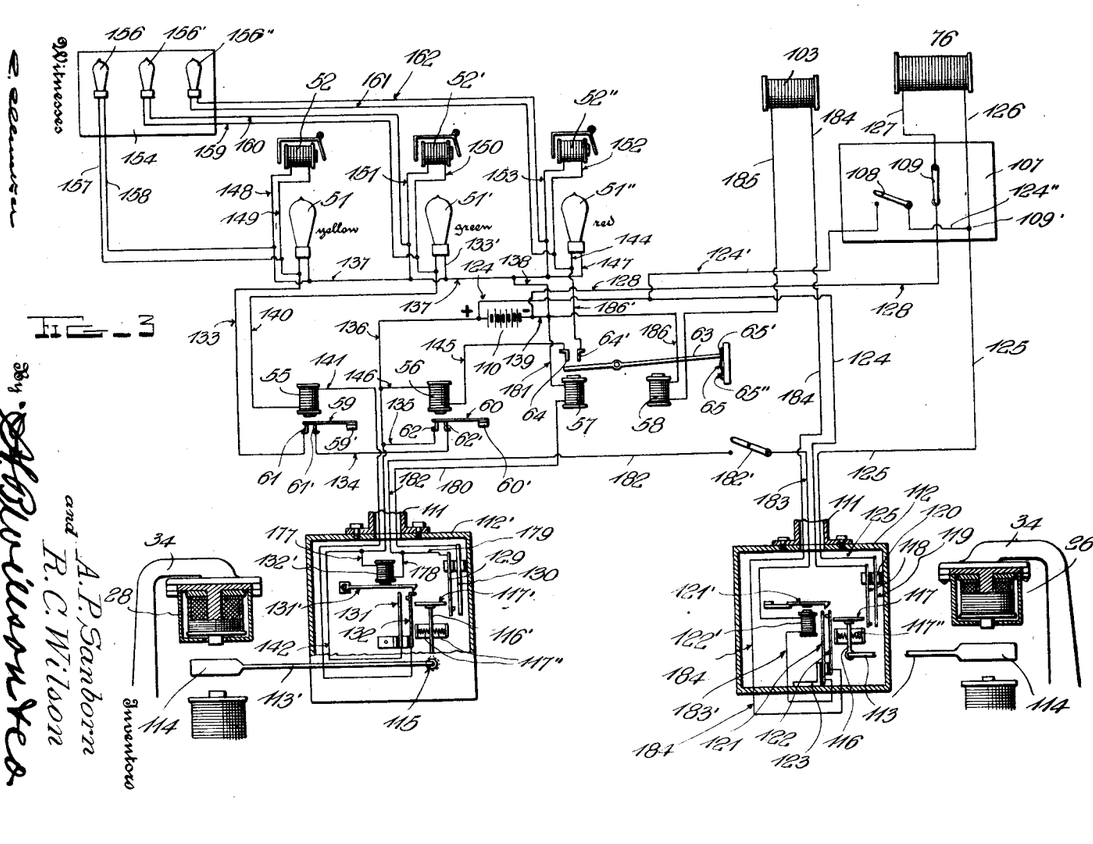
Fig. 2 is a side elevation of the track at the juncture of two blocks showing the relative arrangement and disposition of the track magnets and their circuit controlling means.

Referring more particularly to the drawings, 1 designates a locomotive, 2 the track rail, 3 the small cabinet which is intended to be disposed at the entrance of each block to replace the ordinary semaphore signal as now employed. This cabinet is preferably formed of metal, has a substantially rectangular configuration and is provided with a door opening 4 and door 5 to give access to the interior thereof for repairing the mechanism contained therein when desired. Vertically mounted within the cabinet 3 is a panel 6 formed of any suitable insulated material such as wood fiber, etc. Secured to one face of the panel 6 by angle irons or other fastening means, are the two relays 7 and 8 which are the usual home and distant relays now in common use. Adjacent the home and distant relays 7 and 8 upon the panel 6, are the three electromagnets 9, 10, and 11 disposed in alined and spaced relationship as clearly shown in Fig. 1.

Secured to and insulated from the supporting member 12 is a resilient finger 13 which depends from the support 12 to a point directly in front of the electromagnet 9 and acts as an armature for the latter. Immediately below the resilient finger 13 is another 14 which is secured at one end to the insulated supporting member 15 and has its upper end projecting in front of the electromagnet 10 so as to act as an armature for the latter. Pivotally mounted below the spring finger 14 is a contact member 16 pivoted intermediate its ends on an insulated stud 17 with one end projecting in front of electromagnet 11 and adapted to act as an armature for the same. Contiguous to the lower extremity of the spring finger 13 are the two angular shaped contacts 17 and 18 adapted to be bridged by the finger 13 while adjacent the upper extremity of the resilient finger 14 are the two angular contacts 19 and 20 which are adapted to be normally bridged by the finger 14 and opposite the extremities of the contact member 16 are the two pairs of contacts 21, 22 and 23, 24 adapted to be alternately bridged by the member 16. As it is necessary to normally retain the latter bridging contacts 21 and 22 in electrical connection, there is provided a spring 25 which is secured to the panel and has its free end bearing against the upper end of the contact member 16 as clearly shown in Fig. 1.

Contiguous to the track rails are the two pairs of electromagnets 26, 27, 28 and 29 respectively, one pair being disposed on each side of the track. The pair 26, 27 located on one side of the track will be referred to as the service air and emergency air magnets respectively while those on the other side of the track 28, 29 will be referred to as the clear and caution magnets respectively. These magnets each consist of a rectangular base 30 having a central web 31 which latter is provided with a circumscribing magnetic coil 32 which latter converts said web 31 into the core of the magnet. A cover 33 having therein an opening 33′ whose length and width correspond to the side of the web 31, is disposed upon the coil 32, the web 31 projecting therefrom to permit the latter to perform its predetermined function. Both the cover 33 and the base flange 30 are apertured at their extremities to receive fastening devices by which they may be secured together, as well as fastened to their respective supports. Two of these magnets just described which have been designated as the clear magnet and service air magnet 28 and 26 respectively, are supported in an inverted position by the two pairs of L-shaped brackets 34 the right angular extending upper portions of which are suitably apertured to receive the fastening members passing through said cover and base of the magnet. One pair of said L-shaped brackets 34 is secured to the two adjacent ties and disposed contiguous to the track rails 2 and on one side of the latter at a point about three hundred yards to the rear of the block entrance hereinbefore described and carries the service air magnet 26 while the other pair of L-shaped brackets is disposed on the opposite side of the track contiguous to the rails 2 thereof at a point about one hundred yards from the block entrance. The other magnets 27 and 29 termed the emergency air and caution magnets are mounted upon the opposite sides of the track and have their base flange 30 mounted directly upon two adjacent ties at a point adjacent the block entrance.

Within a well conveniently located near each of the cabinets 3 hereinbefore described, is a battery 35 having one terminal connected to the emergency air magnet 27 by the conductor 36 and the free terminal of the latter being connected by conductor 38 to terminal 19, conductor 39 joining terminal 20 with terminal 21 and conductor 38' connecting terminal 22 with the opposite pole of battery 35 so that the circuit to the emergency air magnet may be completed when desired. As the service air magnet is intended to be energized simultaneously with the emergency air magnet, the former is connected by the conductors 39' and 40 in parallel in the circuit of said emergency air magnet. To energize the clear and caution magnets 28 and 29, the former is connected with the battery 35 by the conductor 40' connecting conductor 38' with the terminal 23, conductor 41 connecting contact member 24 with one terminal of the clear magnet 28, the other terminal thereof being connected by conductor 42 to conductor 36. To place the caution magnet in circuit with battery 35, the former has one terminal connected by conductor 43 with the contact 17, conductor 44 connecting terminal 18 with one terminal of relay 10, the other terminal thereof being connected by conductor 45 with conductor 38' extending from one pole of the battery while the other terminal of the caution magnet is connected with the opposite pole of the battery by conductor 45' which latter is connected to conductor 36.

In order that the electromagnets 9 and 11 may be readily controlled by the towerman, said magnets are included in series in the circuits of the home and distant relays 7 and 8 respectively so that when either of the latter are energized, one of said magnets 9 or 11 will be also energized to actuate its respective armature.

From the connection above set forth, it will be seen that if the distant relay 8 is energized either by a signalman or automatically, the coil 11 connected in series therewith is also energized so that its armature 16 will be actuated to close contacts 23 and 24, permitting current to flow from the positive pole of battery 35 through conductor 38', conductor 40; contact 23, armature 16, contact 24, conductor 41 to clear magnet 28 through the latter, thence through conductors 42 and 36 to the negative pole of battery 35 thus energizing clear magnet for a purpose hereinafter to be described. If, at the next block, the home relay is energized, then the electromagnet 9 in series therewith, will also be energized so as to attract the resilient finger 13 and close contacts 17 and 18 whereby current will be permitted to flow from the positive pole of battery 35 through conductors 38' and 45, electromagnet 10, conductor 44, contact 18, spring finger 13, contact 17, conductor 43 to caution magnet 29 through the latter, and thence through conductors 45', 42 and 36 to the negative pole of battery 35 thus energizing the caution magnet. On the other hand, should both home and distant relay be deënergized, then the contact member or armature 16 will bridge the contacts 21 and 22 and resilient finger 14 will bridge contacts 19 and 20 so that current will flow from the positive pole of battery 35 through conductor 28', contact 22, contact member or armature 16, contact 21, conductor 39, contact 20, spring finger 14, contact 19, conductor 38 to emergency air magnet 27 through the latter, through conductor 36 to the negative pole of battery 35 which will be seen, energizes the emergency air magnet. In addition to energizing the emergency air magnet inasmuch as this circuit also includes the service air magnet which is connected by conductors 40 and 39' with conductors 38 and 36 respectively, the service air magnet will be energized simultaneously with the emergency air magnet as will be readily understood.

Furthermore, it will be noted that when the circuit to the caution magnet is completed as hereinbefore described, by reason of the electromagnet 10 being included therein, the resilient finger 14 will be actuated and disengaged from contacts 19 and 20 so as to open the circuit to the emergency and service air magnets simultaneous with the energization of the caution magnet. So, it will also be seen that when spring contact member or armature 16 is actuated to close the circuit to the clear magnet 28, it will be disengaged from contact 21 and 22 to open the circuit to emergency magnet 27 and vice versa.

The foregoing constitutes the construction and disposition of the different track magnets which are intended to be disposed at the entrance to each block, the energizing circuits therefor, and means for controlling the same also disposed at the entrance to the block whereby either the caution or the clear magnets or the emergency and service air magnets may be energized in accordance with the condition of the block ahead.

Figures 9, 10, 11:
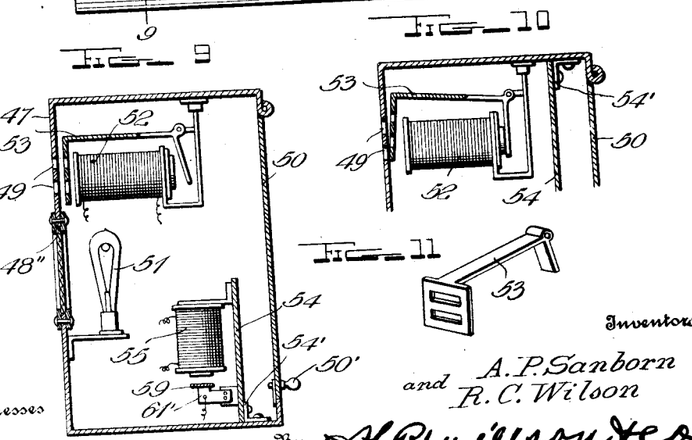
Fig. 9 is a transverse vertical section thereof taken on the line 9—9 of Fig. 8.
Fig. 10 is a fragmentary portion of a similar section, illustrating the drop in actuated position.
Fig. 11 is a perspective view of the drop.
Figure 12:
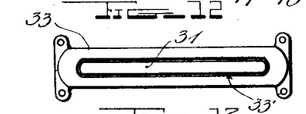
Fig. 12 is a top plan view of one of the track magnets.
Figure 13:
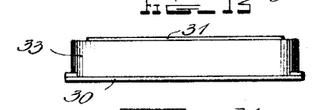
Fig. 13 is a side elevation thereof.
Figures 14, 15:
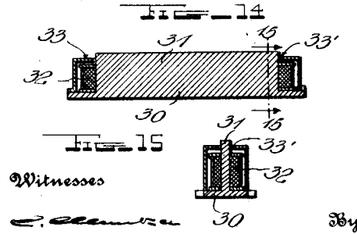
Fig. 14 is a longitudinal section through one of the track magnets.
Fig. 15 is a transverse vertical section taken on the line 15—15 of Fig. 14.

Located within the engine cab in easy view of any occupant thereof, is our improved signal box consisting of a substantially rectangular shaped casing 47 formed of wood or other suitable material and having one face thereof formed with three suitably spaced and alined annular openings 48, 48′ and 48″, which latter are provided with yellow, green, and red colored glass closures. Above each of the openings just referred to are two longitudinally extending and vertically spaced slots 49, 49′ and 49″, the purpose of which will hereinafter appear. The rear of the casing is open and provided with a suitable door 50 and latch for the same 50′. Within the casing immediately to the rear of the openings 48, 48′ and 48″, are three incandescent bulbs 51, 51′ and 51″ and immediately above the latter and to the rear of the openings 49, 49′ and 49″ are three electromagnets 52, 52′ and 52″ secured by brackets in a depending position from the top of the casing 47 as clearly shown in Fig. 9. Disposed on the upper side of each of the magnets is a substantially U-shaped plate 53 having each of its legs disposed at opposite extremities of the electromagnet, one of said legs being disposed adjacent to the openings 49, 49′ and 49″ and provided with longitudinally extending bars adapted to register with said openings and the other end being disposed at such an angle with respect to the magnet coil as to lift the plate whenever said coil is energized, thus bringing the bars on the forward end of the plate into registration with the openings 49, 49′ and 49″ as will be readily understood without further description, and in this connection, it is to be understood that the bars on these plates correspond to the color of the light below that is, the bars on the plate above the yellow signal lamp correspond therewith and so forth.

Figures 17, 18, 19, 20, 21:
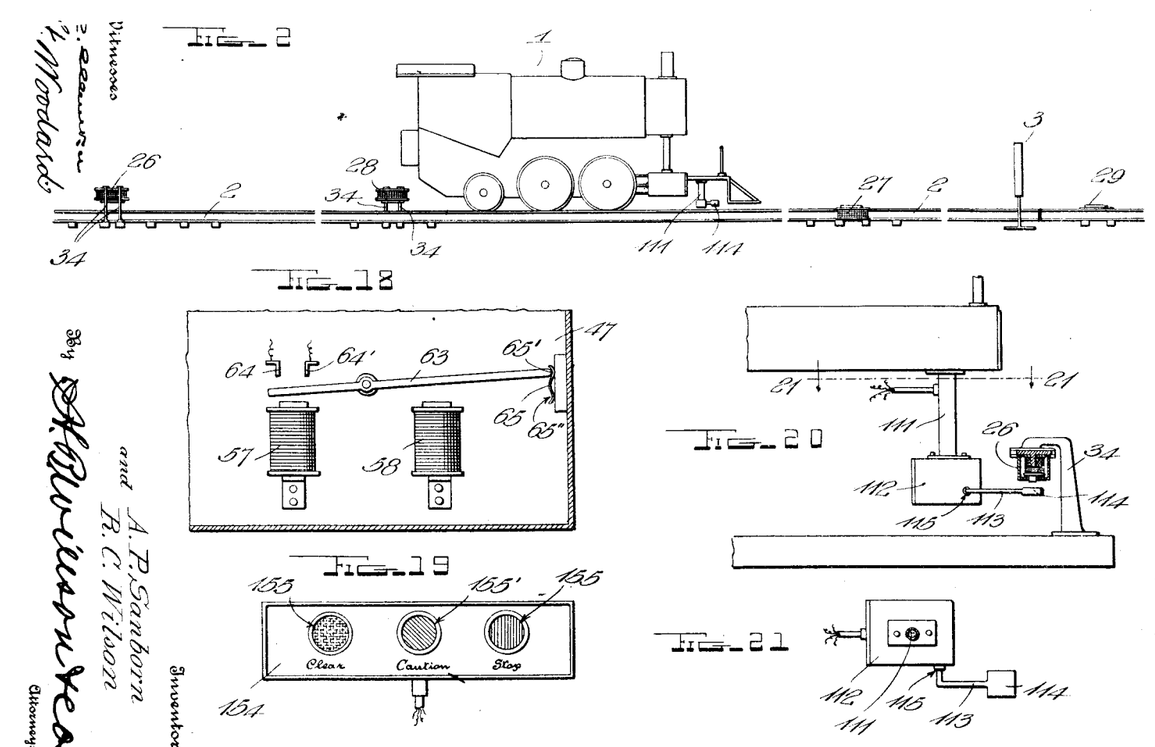
Fig. 17 is a diagrammatic view showing our improved circuit breaker for a train operated electrically.
Fig. 18 is a fragmentary section of our improved signal housing located within the locomotive cab, and illustrating more particularly, the relative arrangement of the double acting armature and its coöperating magnets.
Fig. 19 is a detail view of the cabinet containing the auxiliary signal lamps.
Fig. 20 is a fragmentary showing of an engine pilot beam having our improved housing depending therefrom with the arm which is preferably mounted in said housing disposed beneath the service track magnet which latter is in section.
Fig. 21 is a horizontal section taken on the line 21—21 of Fig. 2.
Figure 17:
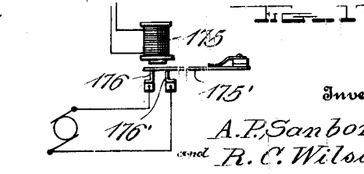

Also within the casing 47 adjacent the door thereof, is a vertically disposed and longitudinally extending panel 54 composed of any suitable insulating material as wood, fiber, etc., and maintained in vertical positions by brackets 54′. Upon one face of the panel 54 are mounted the four electromagnets 55, 56, 57 and 58. Coöperating with the two magnets 55 and 56 are the two resilient fingers 59 and 60 which are connected at one end to two supporting members 59′ and 60′ and having their free ends projecting beneath the coils of their respective magnets. Immediately below the free end of each of the fingers are two terminals 61—61′ and 62—62′ adapted to be bridged by the overlying fingers. Pivotally mounted intermediate its ends above the two magnets 57 and 58, is a double-acting armature 63 having one end coöperating with the two contacts 64—64′ overlying one extremity of said armature. To permanently maintain the armature 63 in actuated position, there is secured in offset relation to the panel, a resilient plate 65 having the indentures 65′ and 65″ adapted to receive one end of armature 63 with which said spring coöperates as will be readily seen on reference to Fig. 18.

In addition to the signal box located within the engine cab, we provide additional means in the locomotive cab which coöperates with the air valve to open the same and bring the train to a standstill comprising a substantially rectangular casing 66 provided with two doors 67 and 67′ together with air pipe openings 68 and 68′ formed therein in planes at right angles to each other to provide passages for the auxiliary air pipes 69 and 69′ extending from the main air pipe. A valve housing 70 provided with a rotary valve, is disposed in said casing 66 at the juncture of the two pipes 68 and 69′ to connect the same. Said rotary valve is formed with a laterally projecting stem 71 carrying an arm 72 which latter at a point suitably spaced from its upper end carries an extension 73, likewise provided with an arm 74. Stem 71 has a coil spring 75 which normally holds the valve closed and the arm 72 in a position substantially at right angles to the air pipe 69. The upper extremities of both arms 72 and 73 are reduced for a purpose to be hereinafter described.

A solenoid 76 is suitably housed and supported within the upper portion of the casing 66, the central portion of said solenoid being substantially in alinement with the reduced end of the arm 74. The core 77 of solenoid 76 is provided with a longitudinally extending opening 78 having its outer end communicating with an opening formed in the solenoid casing while its inner end communicates with a channel 79 which forms a continuation of opening 78. Disposed within the opening 78 is a plunger 80 provided at its extremities with extensions 81 and 82. The latter extends through opening 79 and when the plunger 80 has been brought to actuated position, projects through a suitable opening 82′ formed in the back of the solenoid casing and extends to a point slightly to the rear of the latter. If however, the plunger is in its normal position, the free end of the extension 82 will lie slightly to the rear of opening 82′ of the solenoid casing. The other extension 81 projects through the opening formed in the front of the solenoid casing and has its outer portion slotted as at 82″ to receive the reduced end of the arm 74 whereby when the plunger is drawn inwardly, said arm 74 will be actuated, the valve stem 71 rotated and the air valve completely opened, so as to immediately bring the train to a full stop. Inasmuch as the action of this solenoid 76 is to bring the train to an instantaneous stop, it shall be designated as the emergency relay.

Figure 4:
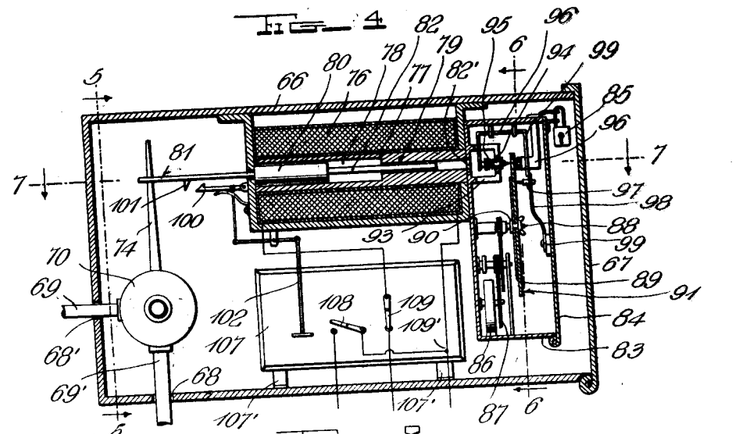
Fig. 4 is a longitudinal vertical section of the solenoid casing.
Figure 5:
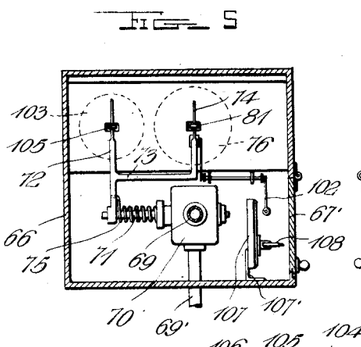
Fig. 5 is a transverse vertical section taken on the line 5—5 of Fig. 4.
Figure 6:
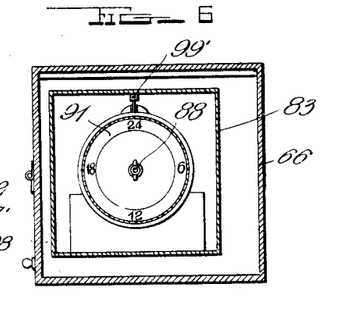
Fig. 6 is a similar view, taken on the line 6—6 of Fig. 4.

Abutting the rear of solenoid 76 is an angular casing 83 provided with a downwardly swinging cover 84 which may be fastened by any locking means 85 to prevent tampering with the contents of the casing. A chronological motor 86 is mounted within the casing 83 and through a train of meshing gears 87 rotates a revolubly mounted shaft 88, which latter carries a metallic disk 89 held in place upon said shaft by a stop 90. A chronological chart 91 is mounted upon the shaft contiguous to the disk, said chart having thereon twenty-four equal divisions corresponding to the twenty-four hours of the day, which latter are further divided into half hours, quarters, etc., as will be readily understood. In the back of the casing 83 in alinement with the extension 82, and plunger 80, is an opening 82′ provided with an inwardly extending sleeve 93 and slidably mounted within the latter is a punch 94 having one end pointed and carrying a coil spring 95 to return the punch to normal position. An L-shaped bar 96 depending from the casing 83 is formed with an opening in its free end coöperating with the punch 94 to limit the penetration of the latter as will be readily seen on reference to Fig. 4. As the upper portion of the chart 91 rotates intermediate punch 94 and bar 96, when the former is forced inwardly, it will pass through the chart and into the opening in said bar 96, thus indicating the time the signal was given.

Supported in front of chart 91 is a marker 97 normally bearing against the face of said chart, whereby when the latter has completed a revolution, there will be an unbroken circle thereon. The marker 97 is supported in proper position by the spring holder 98 which latter has one extremity secured to the door 84 as at 99 and the upper end projecting into the upper portion of the casing.

Slidably mounted within suitable guides secured to the top of the casing, is a U-shaped plate 99′ having one end coöperating with the upper end of spring holder 98 and the other end extending vertically downwardly through an opening in the sleeve 93 into the path of the plunger 82 so that when the latter is actuated its extension will strike against the extremity of said U-shaped plate 99′ to move the same horizontally through its guides and disengage the marker from the face of the chart. Also as the marker holder is mounted upon the door 84, any attempt on the part of the engineer to tamper with the chart will be shown, as opening the door will remove the marker and in this manner break the circle. To lock the plunger 82 in actuated position, we provide a spring actuated catch 100 which engages a shoulder 101 formed in the extension 82. A hand release 102 enables the engineer to disengage the latch 100 whenever he desires to do so. Hence, it will be seen that when emergency magnet or solenoid 76 is energized, the plunger 80 will be drawn inwardly and the brakes instantly applied while at the same time, a record is made signifying the exact minute the application of the brakes occurred.

Figure 7:
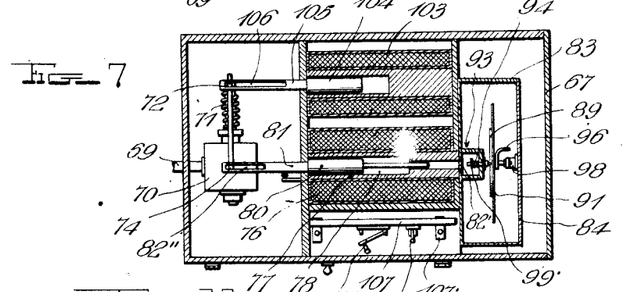
Fig. 7 is a horizontal section taken on the line 7—7 of Fig. 4.
Figure 8:
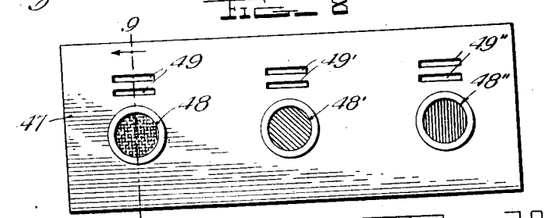
Fig. 8 is a front elevation of the signal cabinet or casing, illustrating the various colored glass closures for the openings therein and the slots for the annunciator drop.

Within the casing 66 besides the emergency solenoid 76, is a second solenoid 103, the structure of which is identical with that of solenoid 76 with the exception that its plunger 104 has only one extension 105. This extension is formed with a slot 106 at its outer end which engages the reduced end of arm 72 as clearly shown in Fig. 7. As this solenoid is merely intended to only partially open the air valve in the housing 70, it is necessary to allow for a further movement of the arm 72 when the emergency solenoid is energized. Therefore, the plunger opening 78 in solenoid 76 is slightly longer than that of solenoid 103 as will be readily understood without further explanation. This last mentioned solenoid 103 will be designated as the service solenoid because it does not completely open the air valve but brings the train to a gradual stop, the same as the engineer would do if he stopped the train in the ordinary manner.

A switch panel 107 vertically supported within the casing 66 upon suitable brackets 107′ carries two switches 108 and 109 together with a terminal 109′ for a purpose to be hereinafter referred to. Within the locomotive cab preferably under the engineer's seat therein, is located a battery 110 which is intended to supply the necessary current for the two solenoids and signals hereinbefore described.

Depending from the pilot beam of the locomotive on opposite sides of the latter, are the two hollow metal standards 111, and bolted to the lower extremities of the same are the annular metallic housings 112 and 130

112' respectively. As clearly shown in Fig. 3, right angularly shaped steel arms 113 and 113' each having an enlarged outer extremity as at 114 are pivoted at their inner ends within the housings 112 and 112' and project through openings 115 therein and then extend in a plane at right angles to that portion projecting through the casing, sufficiently to pass above and below the service or emergency air magnets hereinbefore referred to.

Within the housing 112 adjacent the inner pivoted ends of the arms 113 and 113' are formed upwardly and right angular branches 116 and 116' on the top of which are formed insulated T-heads 117 and 117', equalizing coiled springs 117'' normally maintaining the arms in a horizontal position as will be readily understood without further description.

Within the housing 112 immediately in front of the branch 116 are the lower extremities of two spring contacts 118 and 119, which are properly insulated from each other and depend from the insulated block 120 fixed to the side of the casing. By arranging the contacts in this manner, when arm 113 is moved downwardly, that is when it is passed above the emergency air magnet and is attracted by the latter and moved downwardly, as the lower extremity of spring contact is in the path of the moving T-head 117, the two contacts 118 and 119 are brought into engagement and the circuits which they control are thereby closed. To the rear of branch 116 are two other spring contacts 121 and 122 vertically supported in insulated relation upon the insulated bracket 123 as clearly shown in Fig. 3. By this means, when the arm 113 is lifted, spring contact 122 will be in the path of the opposite end of T-head 117, the two contacts 121 and 122 will be brought together and the circuit which they control closed. These spring contacts 118 and 119 are connected in series with battery 110 and emergency magnet or solenoid 76 so that when brought together, current will flow from the positive terminal of battery 110 through conductor 124, spring contacts 118 and 119, conductor 125, terminal 109', conductor 126 to one terminal of solenoid 76, and from the other binding post thereof through conductor 127, switch 109, conductor 128 to the opposite pole of battery 110 which energizes the emergency air magnet or solenoid 76, causing the same to operate in the manner hereinbefore described.

The spring contacts 121 and 122 are connected in series with the service air magnet 122 and with the electromagnet 58 which controls the armature 63 so that when arm 113 passes beneath the service track magnet 26, it will be lifted thereby, which will cause the T-head 117 to be brought into engagement with spring contact 122, causing the latter to contact with the adjacent spring contact 121, so as to permit current to flow through the service solenoid and said electromagnet in a manner to be hereinafter described. To permanently retain the two contacts in engagement with each other, we provide a catch 121' disposed above the extremities of the contacts 121 and 122 and adapted to be brought into engagement with the latter by the electromagnet 122' disposed immediately below said catch to actuate the latter.

Disposed within the other housing 112' in front of the branch 116 are two suitably spaced and insulated contacts 129 and 130 which depend from the top of said casing so as to have their lower extremities interposed in the path of the T-head 117 whereby as the arm 113 is moved upwardly by the clear track magnet under which it passes, said contacts 129 and 130 will be brought into engagement for a purpose hereinafter to be described. Two other contacts 131 and 132 are supported in spaced and insulated relationship within the casing with their upper extremities disposed contiguous to the opposite end of the T-head 117 so that when the arm 113' is moved downwardly as it passes above the caution track magnet, the aforesaid T-head 117 will be brought into engagement with contact 132 so as to bring the latter into contact with contact 131 for a purpose to be hereinafter referred to. Furthermore, that the contacts 131 and 132 may be permanently locked in engagement with one another, we provide a locking member 131' pivotally mounted above the upper end of said contacts and controlled by the electromagnet 132' so that when the latter is deënergized, this locking member 131' will drop and engage the upper end of contact 132 to retain the same as will be understood without further description.

To enable the yellow light 51 hereinbefore referred to, to be energized by battery 110, the former is in circuit with the latter through conductor 133 which is connected to one terminal of said lamp, contacts 61 and 61', resilient finger 59 conductor 134, contacts 62' and 62, conductor 135 and conductor 136 connected with the positive pole of battery 110 while the other terminal of the lamp 51 is connected by conductors 137, 138 and 139 with the negative pole of said battery. To energize the lamp 51' and electromagnet 55, the latter are included in the circuit of battery 110 by means of conductors 140 extending from one terminal of lamp 51' to one terminal of electromagnet 55, conductor 141 extending from the other terminal of said magnet to contact 132 and conductor 142 extending from the coacting contact 131 to the conductor 136, the other terminal of the lamp being connected through 139 conductors 133', 137, 138 and 139 to the negative pole of battery 110. To energize lamp 51" it is included in the circuit of battery 110 through conductor 144 extending from one terminal of light 51" to contact 64', conductor 145 extending from contact 64 to one terminal of electromagnet 56, conductor 146 extending from the other terminal of said relay to conductor 136 extending to the positive pole of battery 110; the other terminal of said lamp being connected by conductors 147, 138 and 139 with the negative pole of battery 110.

As it is essential that the electromagnets 52, 52' and 52" be energized simultaneous with the energization of lamps 51, 51' and 51" respectively, said electromagnets are connected in parallel with the circuits of said lamps that is, electromagnet 52 is connected by conductors 148 and 149 with the circuit of light 51; electromagnet 52' is connected by conductors 150, 151 with the circuit of light 51' and electromagnet 52" is connected by conductors 152, 153 with the circuit of lamp 51" as clearly shown in Fig. 3.

As it may sometimes be desirable to have what may be termed an auxiliary set of signals working in conjunction with those in the locomotive cab, we provide a small rectangular shaped casing 154 which may be attached to the last car of a train or any other suitable position and provide said casing with a series of alined and suitably spaced annular openings 155, 155' and 155", which latter are provided with glass inclosures colored yellow, green, and red respectively and to the rear of each of these openings within the casing we dispose three incandescent bulbs 156, 156' and 156" which latter are connected in parallel with the circuits of the yellow, green and red lights in the hereinbefore described signal disposed in the engine cab, that is, incandescent bulb 156 is connected in parallel with the circuit of lamp 51 by conductors 157, 158; light 156' is connected in parallel with lamp 51' by conductors 159, 160; and lamp 156" is connected in parallel with the circuit of lamp 51" through conductors 161 and 162.

As in the operation of our system, we have found it advantageous to close the steam valve simultaneously with the application of the air brakes, we also provide a valve casing 163 connected with the steam pipe and having valves and seats 164 and 165 to open and close the by-passes formed in the valve. The valves 164 carry a stem 166 which extends through an opening 167 in the top of the casing to project above the latter. A plate 168 having a suitable opening to admit the stem 166 is disposed on top of the casing 163 and carries an arm 169. Pivotally connected to the arm 169 is a bell crank 170 which is connected to the upper extremities of the valve stem 166. Encircling the stem 166 intermediate the arm 170 and plate 168 is a coiled spring 171 normally maintaining the valve in an open position.

Figure 16:
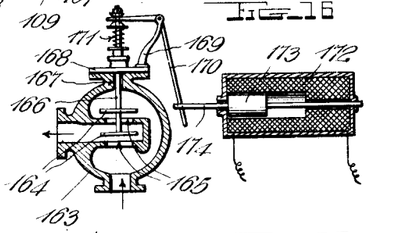
Fig. 16 is a longitudinal section of the steam controlling valve and its coöperating solenoid.

Suitably mounted in the cab adjacent the valve, is a solenoid 172 having its core longitudinally slotted and provided with a plunger 173 carrying an extension 174 which engages the free end of bell crank 170 so that when the solenoid 172 is energized its plunger will be drawn inwardly and bell crank 170 actuated to close the valve as will be readily understood on referring to Fig. 16. This solenoid just described, is included in the circuit of the service air magnet carried by the train, which circuit will hereinafter be traced. Should this system however, be used in conjunction with an electrically operated train, we provide an electromagnet 175 in the circuit of the service air magnet instead of solenoid 172. This electromagnet 175 controls a pivotally mounted contact 175' which normally engages the terminals or contact points 176 and 176' of the motor circuit of the car whereby if electromagnet 175 is energized, the movable contact member will be lifted, thus disengaging said member from contacts 176 and 176' and breaking the car's motor circuit to stop the latter.

From the foregoing description, taken in connection with the accompanying drawings, the operation of this system is as follows: Assuming the circuits to be all normally open, should the signalman through the circuit closing mechanism located at the entrance to each block, energize the caution magnet 29 then the arm 113' carried by the train and pivotally mounted in housing 112' is drawn downwardly by said magnet which actuating branch 116' brings T-head 117' into engagement with contact 132 contacting the latter with contact 131 and thus completing a circuit from positive pole of battery 110 through conductors 136, 142, spring contact 131, contact 132, conductor 141, electromagnet 155, conductor 140, green lamp 51' and conductors 133', 137, 138 and 139 to the negative pole of battery 110 which it will be seen displays the green signal to advise the engineer that he should proceed with caution, and at the same time energizes magnet 55, so that the latter will actuate spring finger 59 and disengage the latter from contacts 61 and 61'.

If however, the clear magnet 28 is energized instead of caution magnet 29 then as arm 113' passes below said magnet 28, it will be attracted by the latter and lifted so that branch 116' is actuated to bring one end of its T-head 117' into engagement with the spring contact 129 bringing the latter to bear against contact 130 and completing a circuit from the positive pole of battery 110 through conductors 136, 142, conductor 177, through electromagnet 132', conductor 178 to conductor 179, spring contacts 129, 130, conductor 180 to one terminal of electromagnet 57 through the latter and from the other terminal thereof through conductor 181 to conductor 139 and the negative pole of battery 110. This it will be seen causes the energization of the electromagnet 132' and elevates its coöperating armature 131' to release contacts 131 and 132 and consequently breaking the circuit of green lamp 51' if it has been previously closed and deenergizing electromagnet 55, which latter allows spring finger 59 to drop back into engagement with the contacts 61 and 61' so as to complete the circuit of the yellow light and permits current to flow from the positive pole of battery 110 through conductors 136, 135, contact 62, spring finger 60, contact 62', conductor 134, contact 61', spring finger 59, contact 61, conductor 133, lamp 51, conductors 137, 138 and 139 to the negative pole of battery 110. At the same time, current will flow through conductors 148, 149 to the electromagnet 52, energizing the latter and bringing the drop into its proper position and also to conductors 157 and 158 energizing the auxiliary lamp 156, all of which will notify the engineer that safety conditions exist and he may proceed at full speed ahead.

On the other hand, should both clear and caution magnets be deënergized and the service and emergency air magnets energized in lieu thereof, then as the other arm 113 carried by the train passes below the service magnet, it will be lifted by the latter to bring the T-head 117 carried by branch 116 into engagement with contact 122, causing the latter to bear against contact 121 so as to complete a circuit from the positive pole of battery 110 through conductors 136, 142, 177, electromagnet 132', conductors 178, 182 to one terminal of the switch 182' through the latter and through the opposite terminal thereof and through conductor 183 to one terminal of electromagnet 122' and from the other terminal of the latter through conductor 183' contacts 121, 122, conductor 184, solenoid 103, conductor 185 to one terminal of electromagnet 58 through the latter, and from the other terminal thereof through conductors 186 and 139 to the negative pole of battery 110, which it will be seen energizes the solenoid 103 to retract its plunger and partially open the air valve to gradually bring the train to a stop and at the same time energizes magnet 132' which actuates armature 131' so as to release contacts 131, 132 should they have been brought together to complete the caution lamp circuit; also energizes magnet 58 which actuates armature 63 and brings the latter in contact with the terminal 64 and 64' so that a circuit is completed from the positive pole of battery 110 through conductors 136 and 146 to one terminal of electromagnet 56 through the latter and from the other terminal thereof through conductor or 145 to contact 64, thence through arm, re to contact 64' from the latter through conductor 186' to one terminal of the red light 51'' through the same and from the other terminal thereof through conductors 147, 138 and 139 to the negative pole of battery 110, thus displaying the danger signal and informing the engineer as to the dangerous condition of the block ahead and at the same time, notifying him that his brakes are being applied. Simultaneous with the completion of the circuit through lamp 51'' by reason of the parallel connection of electromagnet 52'' with the lamp circuit through conductors 152 and 153, the drop will be brought into action, also through the parallel connection of the auxiliary red light with the lamp 51'' by conductors 161 and 162, the former will be lighted simultaneous with the latter as understood without further description. In addition to completing this red light circuit, energizing the electromagnet connected therewith and completing the circuit through the auxiliary lamp, this circuit last traced also energizes electromagnet 56 so as to actuate spring finger 60 and disengage the latter from contacts 62 and 62' whereby the circuit of the white light is broken if the latter happened to be closed at the time the danger signal was completed.

If the train should fail to come to a stop after traveling about three hundred feet, the distance between the service air magnet and the emergency air magnet 27, the latter will attract arm 113 as it passes thereover and pulling the same downwardly, will cause the T-head 117 to bring spring contacts 118, 119 together which closes the circuit controlled thereby and energizes the emergency magnet or solenoid 76 which retracting its plunger by reason thereof, will operate the arm 74 and completely open the air valve which instantly stops the train. Simultaneously with the actuation of the arm 74, the plunger 79 contacting with punch 94 causes the latter to pass through chart 91 and register the time at which the emergency signal was given.

As it may be sometimes desirable to test the emergency or solenoid 76, we provide a shunt circuit extending from conductor 124 through conductor 124' to one terminal of switch 108 and through the other terminal thereof through conductor 124'' to terminal 109' so that when switch 108 is closed, a circuit will be completed through the solenoid as will be readily understood without further tracing.

From the foregoing description, it will be seen that we have provided a block signaling system which is simple, accurate, and efficient, one which will at all times give the engineer an absolute and correct understanding relative to the right of way and at the same time provides means which will automatically bring his train to a standstill should he unheedingly pass a signal indicative of danger.

From the foregoing description, taken in connection with the accompanying drawings, the construction and operation of the invention will be readily understood without requiring a more detailed explanation.

Various changes in form, proportion and the minor details of construction may be resorted to without departing from the principle or sacrificing any of the advantages of the claimed invention.

We claim as our invention:

1. In an automatic block signaling system of the character described, the combination with a pair of signals indicative of caution and danger, and an air controlling valve, a solenoid operatively connected with said valve, an electrically energized circuit for said solenoid, a switch member in said circuit, a movable arm adapted to close said member, means for operating said arm, additional circuits for said danger and caution signals, a magnet in the first named circuit, an armature for said magnet adapted to close the circuit through said danger signal, an additional magnet in the first named circuit, and an armature for said additional magnet adapted to break the circuit through said caution signal simultaneously with the closing of the circuit through said solenoid.

2. In an automatic block signaling system of the character described, the combination with a pair of signals indicative of danger and safety, and an air controlling valve, a solenoid operatively connected with said valve, an electrically energized circuit for said solenoid, a switch member in said circuit, a movable arm adapted to close said member, means for operating said arm, additional circuits for said danger and safety signals, a magnet in the first named circuit, an armature for said magnet adapted to close the circuit through said danger signal, an additional magnet in the last mentioned circuit, and an armature for the former adapted to break the circuit through the safety signal simultaneously with the closing of the circuit through said danger signal.

3. In an automatic block signaling system of the character described, the combination with a plurality of magnets disposed contiguous to the track, and means for energizing said magnets, of a pair of signals carried by the train indicative of caution and safety, electrically energized circuits for said signals, an additional circuit, a switch member in the latter, a movable arm operated by said magnets and coöperating with said member for closing the same, an additional magnet in said additional circuit, an additional switch member in the circuit of said caution signal, and an armature for said magnet coöperating with said additional member for opening the latter.

4. In an automatic block signaling system of the character described, the combination with a plurality of magnets disposed contiguous to the track, and means for energizing said magnets, of a pair of signals carried by the train and indicative of danger and safety, electrically energized circuits for said signals, an additional circuit, a switch member in the latter, a movable arm operated by said magnets and coöperating with said member for closing the same, a magnet in said additional circuit, an armature for said magnet adapted to open the circuit through said danger signal, an additional magnet in the circuit of said danger signal, and an armature for the former adapted to close the circuit through said safety signal simultaneously with the opening of the circuit through said danger signal.

5. In an automatic block signaling system of the character described, the combination with a plurality of signals indicative of caution, safety, and danger, and energizing circuits for said signals, of an electro-magnet in the circuit of said caution signal, an armature for said magnet and adapted to close one break in the circuit of said safety signal, an electro-magnet included in the circuit of said danger signal, an armature for said magnet, said armature being adapted to close the remaining break in the circuit of said safety signal, an additional electro-magnet, an energizing circuit therefor, an armature for said additional electromagnet, said armature being adapted to close a break in the circuit of said danger signal, switch members in the respective circuits of said safety signal and said additional magnet, a movable arm carried by the train and adapted to close one of said switch members when actuated in one direction, and to close the other switch member when operated in the opposite direction, and means disposed contiguous to the track to actuate said arm in opposite directions, substantially as and for the purpose set forth.

6. In an automatic block signaling system, the combination with an electromagnet disposed contiguous to the track, and means for energizing said magnet, of a pair of signals carried by the train and indicative of safety and caution, energizing circuits for said signals, a switch included in the circuit of said caution signal, a movable arm carried by the train and influenced by said magnet to coöperate with said switch and close the circuit of said caution signal, and means controlled by the circuit of the latter to interrupt the circuit of said safety signal during the maintenance of said caution circuit substantially as and for the purpose set forth.

7. In an automatic block signaling system, the combination with an electromagnet disposed contiguous to the track and means for energizing the same; of a pair of signals carried by the train, energizing circuits for said signals, a switch in each of said circuits, one of said switches being normally open, the other closed, an arm movably mounted on the train adapted to be influenced by said electromagnet, said arm coöperating with the normally opened switch to close the latter and complete the circuit of one of said signals, and means included in the last mentioned circuit to open the normally closed circuit during the completion of the normally open circuit.

8. In an automatic block signaling system, the combination with an electromagnet disposed contiguous to the track, and means to energize said magnet; of a pair of signals carried by the train, energizing circuits therefor, one of the latter being normally open, the other closed, switches included in and controlling said circuits, an arm movably mounted on the train and coöperating with the switch of said normally open circuit to close the same, and an electromagnet included in said normally open circuit to govern the switch in the normally closed circuit, whereby when one circuit is energized, the other will be deënergized substantially as and for the purpose set forth.

9. In an automatic block signaling system, the combination with an electromagnet disposed contiguous to the track and means to energize said magnet; of signals carried by the train, one indicating caution, the other safety, energizing circuits for said signals, a switch included in each of said circuits, the switch in the circuit of said safety signal maintaining the latter normally closed, the switch in the circuit of said caution signal being normally open, means movably mounted upon the train and influenced by said electromagnet to close the circuit of said caution signal, and means included in the latter to open the switch in the circuit of said safety signal during the interval the circuit of the caution signal is maintained in closed condition substantially as and for the purpose set forth.

10. In an automatic block signaling system the combination with two track magnets disposed in planes one above the other and in predetermined relation; and means to energize said magnets, of a pair of signals carried by the train, energizing circuits therefor, means to maintain one of said circuits normally closed, the other open, a movable arm carried by the train and adapted to pass above and below said magnets to be actuated in opposite directions thereby, coöperating means in said circuits controlled by the movement of said arm, whereby movement of the latter in one direction reverses the condition of the circuits, means to retain said circuits in reversed condition, and means coacting with said arm when the latter is moved in an opposite direction to restore the circuits to their original condition.

11. In an automatic block signaling system of the character described, the combination with a plurality of magnets disposed contiguous to the track, and means to energize said magnets; of an arm movably mounted upon the train and actuable in opposite directions by said magnets, a plurality of signals carried by the train and indicating safety, caution and danger, energizing circuits for the respective signals, means to complete the circuit of said danger signal, coöperative means relatively arranged in the circuits of the respective signals and controlled by said arm, whereby movement of the latter in one direction opens the safety and caution signal circuits, and when actuated in the opposite direction reverses the condition of the safety and caution signal circuits.

12. In an automatic block signaling system of the character described, a plurality of energizable members disposed contiguous to the track, movable arms carried by the train and adapted to be influenced by said members, a battery circuit also carried by the train, a plurality of signals indicative of safety, caution, and danger energized by said battery, and coöperating means included in the respective circuits of said signals and coacting with one of said movable arms whereby when the latter is actuated in one direction, the circuit of one of said signals will be broken, the other closed and when actuated in the opposite direction, the condition of the circuits is reversed, an air controlling valve, a solenoid included in the circuit of said battery and operatively connected with said valve to actuate the latter and means included in the circuit of said solenoid and coöperating with said arm whereby when the latter is moved in one direction, said solenoid will be energized, the circuit of one of said signals closed, and the circuit of the remaining signals broken, substantially as and for the purpose set forth.

13. In an automatic block signaling system of the character described, a plurality of energizable members disposed contiguous to the track, movable arms carried by the train and adapted to be influenced by said members, a battery circuit also carried by the train, a plurality of signals indicative of safety, caution, and danger energized by said battery, coöperating means included in the respective circuits of said signals and coacting with one of said movable arms whereby when the latter is actuated in one direction, the circuit of one of said signals will be broken, the other closed and when actuated in the opposite direction, the condition of the circuits is reversed, an air controlling valve, a service solenoid included in the circuit of said battery and operatively connected with said air valve to partially actuate the same, an emergency solenoid also included in the circuit of said battery, means controlled by said solenoid to completely open said air valve, means influenced by said emergency solenoid to record the time said valve is actuated, means included in the circuit of said service solenoid and coöperating with the other movable arm whereby when the latter is actuated in one direction, said solenoid will be energized, the circuit of one of said signals completed, and the circuit of one of said other signals broken, and means included in the circuit of said emergency solenoid and coöperating with said arm whereby when the latter is actuated in an opposite direction, said solenoid will be energized to completely open said valve substantially as and for the purpose set forth.

14. In an automatic block signaling system of the character described, the combination with a plurality of magnets disposed contiguous to the track, and means for energizing said magnets, of a plurality of signals carried by the train and indicative of caution, safety and danger, electrically energized circuits for said signals, an air controlling valve, a service solenoid operatively connected with said valve for partially opening the latter, a circuit for said solenoid, an emergency solenoid operatively connected with said valve for completely opening the latter, a circuit for said emergency solenoid, switch members in the circuits of said solenoids, a movable arm operated by said magnets and coöperating with said switch members to close the circuit through said service solenoid when moved in one direction and to close the circuit through said emergency solenoid when moved in the opposite direction, means included in the circuit of said service solenoid for closing the circuit through said danger signal and for breaking the circuit through said caution signal, and additional means included in the circuit of said danger signal for breaking the circuit through said safety signal.

In testimony whereof we have hereunto set our hands in presence of two subscribing witnesses.

ARTHUR P. SANBORN.
ROY C. WILSON.

Witnesses:
H. P. HORTON,
R. WINTER.